(12) United States Patent
Jeon et al.

(10) Patent No.: US 6,560,251 B1
(45) Date of Patent: May 6, 2003

(54) MODE-LOCKED LASER STABILIZING APPARATUS AND METHOD THEREOF

(75) Inventors: Min Yong Jeon, Taejon (KR); Hak Kyu Lee, Taejon (KR); Dong Sung Lim, Songnam (KR); Joon Tae Ahn, Taejon (KR); Do Il Chang, Seoul (KR); Kyong Hon Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 141 days.

(21) Appl. No.: 09/705,582

(22) Filed: Nov. 2, 2000

(30) Foreign Application Priority Data

Nov. 3, 1999 (KR) .............................. 99-48442

(51) Int. Cl.[7] ................................................ H01S 3/13
(52) U.S. Cl. ............................................... 372/31; 372/6
(58) Field of Search ......................... 372/31, 6; 385/27; 250/205; 359/241

(56) References Cited

U.S. PATENT DOCUMENTS

| | | | |
|---|---|---|---|
| 5,537,671 A | * 7/1996 | Toyama et al. | ............... 385/27 |
| 5,590,142 A | 12/1996 | Shan | ........................... 372/18 |
| 5,646,774 A | 7/1997 | Takara et al. | ............... 359/340 |
| 5,771,250 A | * 6/1998 | Shigehara et al. | ............. 372/6 |
| 5,929,430 A | * 7/1999 | Yao et al. | ................... 250/205 |
| 6,304,362 B1 | * 10/2001 | Zheludev et al. | ........... 359/241 |

* cited by examiner

Primary Examiner—Paul Ip
Assistant Examiner—Tuan Nguyen
(74) Attorney, Agent, or Firm—SEED IP Law Group PLLC

(57) ABSTRACT

There is disclosed a mode-locked optical fiber laser stabilizing apparatus for stabilizing the length of the optical fiber laser resonator by feedbacking the optical signals to the laser resonator, in the direction where the signal reflected by the optical fiber loop mirror is detected as an error signal to minimize the signal, and method thereof. According to the present invention, a resonator stabilizing apparatus in an optical fiber laser includes a non-linear optical amplitude loop mirror (NALM) for non-linearly amplifying a laser pumped laser light, a linear loop mirror of a closed loop shape for confining the laser light sufficiently amplified by the non-linear optical amplitude loop mirror; a light isolator for proceeding the light confined by said linear loop mirror only in one direction, an optical coupler for detecting the light proceeding in the direction opposite to the light isolator by the linear loop mirror, the phase of which is varied in the non-linear optical amplitude loop mirror, and a piezo-electric transducer (PZT) for performing a signal processing for minimizing the amount of light proceeding in an opposite direction when the light detector detects the light proceeding in the opposite direction and feedbacking again the light to stabilize the light, the light detector is coupled by the linear loop mirror and the optical coupler.

6 Claims, 1 Drawing Sheet

MODE-LOCKED LASER STABILIZING APPARATUS AND METHOD THEREOF

TECHNICAL FIELD

This invention relates generally to an optical fiber laser stabilizing apparatus and method thereof. More particularly, it relates to an apparatus for stabilizing a mode-locked optical fiber laser by feedbacking an optical signal to a laser resonator, and method thereof.

BACKGROUND OF THE INVENTION

In most active type mode locking optical fiber laser, if stabilization is not realized, significant errors are caused in the optical signal. Generation of these errors makes the laser useless in the real system.

In order to solve these technical problems, the technology of stabilizing the optical fiber in the mode-locked optical fiber laser has been studied. So far, stabilization in the active type mode locking optical fiber laser has been studied in various ways.

The stabilization technology in the conventional active type mode locking optical fiber laser is to compensate for changes in the length of the laser resonator due to changes in the external environments. Thus, a signal processing method, etc., which monitors the optical signals using relaxation oscillation of the optical fiber or a 2×2 light modulator in order to compensate for the changes in the length of the laser resonator, has been used.

As an example, U.S. Pat. No. 5,590,142 entitled "MODE-LOCKED FIBER RING LASER STABILIZATION", which was issued to Xuekang Shan, discloses the technology of stabilizing the length in the optical resonator to the point where the variations in the phase are minimized by measuring the variations in the phase of the laser output and the phase of the laser output light, in order to stabilize the laser output by measuring the changes in the phase of the laser output. Thus, there is advantageously disclosed that there is no need for a RF frequency driver because it uses lower frequency than the life of the gain medium to feedback the variation in the phase to the piezo-electric transducer (PZT).

However, the U.S. Pat. No. 5,590,142 has a drawback that the variations in the phase of the laser output and the synthesizer must be exactly measured.

Meanwhile, U.S. Pat. No. 5,646,774 entitled "MODE-LOCKED LASER STABILIZATION METHOD AND APPARATUS", which was issued to Hidehiko Takara, etc., discloses the technology of stabilizing the laser resonator by measuring the relaxed oscillating frequency components from the laser resonator and then performing a signal processing for minimizing this signal, in order to stabilize the output of the laser resonator by measuring the relaxed oscillating frequency components. Thus, there is advantageously disclosed that the laser resonator could be stabilized using low frequency components of relaxed oscillating frequency components without an additional high frequency oscillator.

However, the U.S. Pat. No. 5,646,774 has the advantage that it does not need an additional high frequency generator, but it has a drawback it has to exactly measure the frequency components, as in the above-mentioned U.S. Pat. No. 5,590,142.

SUMMARY OF THE INVENTION

The present invention is contrived to solve the above conventional problems and is thus to stabilize the laser resonator simply, by detecting the reflected signal on the loop as an error signal to thus minimize the detected signal, not by detecting any optical signal or any specific frequency components to thus feedback it to the resonator.

In other words, an object of the present invention is to provide a mode-locked optical fiber laser stabilizing apparatus for stabilizing the length of the optical fiber laser resonator by feedbacking the optical signal to the laser resonator, in the direction where the signal reflected by the optical fiber loop mirror is detected as an error signal to minimize the signal, and method thereof.

In order to accomplish the above-mentioned purpose, a resonator stabilizing apparatus in an optical fiber laser according to the present invention includes a non-linear optical amplitude loop mirror (NALM) for non-linearly amplifying a laser pumped laser light, a linear loop mirror of a closed loop shape for confining the laser light sufficiently amplified by the non-linear optical amplitude loop mirror, a light isolator for proceeding the light confined by said linear loop mirror only in one direction, an optical coupler for detecting the light proceeding in the direction opposite to the light isolator by the linear loop mirror, the phase of which is varied in the non-linear optical amplitude loop mirror, and a piezo-electric transducer (PZT) for performing a signal processing for minimizing the amount of light proceeding in an opposite direction when the light detector detects the light proceeding in the opposite direction and feedbacking it again to stabilize the light, the light detector is coupled by the linear loop mirror and the optical coupler.

Also, a method of stabilizing a resonator having a loop mirror in an optical fiber laser according to the present invention is provided. The method includes the following steps. A first step is of non-linearly amplifying a laser pumped light and confining the amplified laser light in a closed loop route. A second step is of making said light confined in said closed loop route proceed only in one direction. A third step is of detecting any light proceeding in the direction opposite to the proceeding direction of said second step by said loop mirror when a phase of said light is varied. And a fourth step is of performing a signal processing in the direction where the amount of light in the opposite direction is minimized if the light proceeding in the opposite direction in the third step is detected and of feedbacking it again to stabilize the light.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

Figure 1:
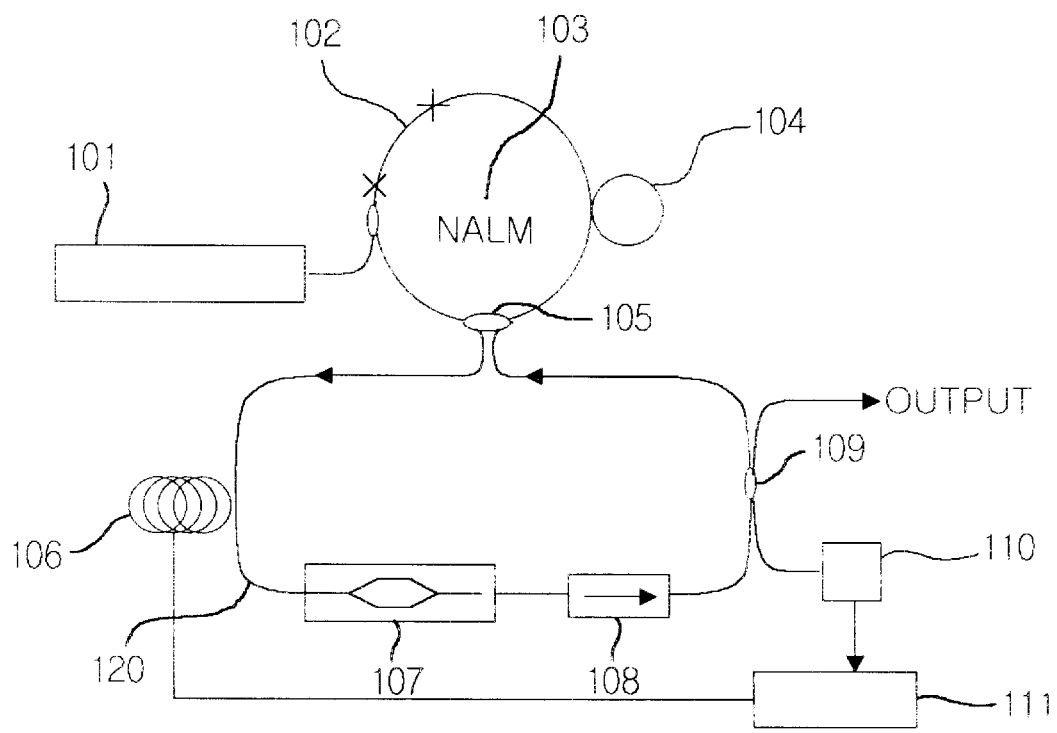
FIG. 1 shows a diagram for illustrating a mode-locked optical fiber laser stabilizing apparatus according to preferred embodiment of the present invention.

The present invention will be described in detail by way of a preferred embodiment with reference to accompanying drawings.

FIG. 1 shows a diagram for illustrating a mode-locked optical fiber laser stabilizing apparatus according to preferred embodiment of the present invention. The laser stabilizing apparatus includes a non-linear amplitude loop mirror (NALM) 103 having a pump laser 101 for pumping a gain medium, an optical fiber 102 including erbium (Er)

for giving a non-linearity and a polarized light maintenance single-mode fiber (PM-SM Fiber) 104 for giving a non-linearity; an electrically varying piezo-electric transducer (PZT) element 106 for compensating for the length of the laser resonator by the feedback of the optical signal through a 50:50 optical coupler 105, and a linear loop mirror 120 having a light modulator 107 for modulating loss or phase of the resonator with a given frequency to implement an active type mode locking and an isolator 108 for proceeding the light in one direction, wherein most of the signals are outputted as output signals through a 2×2 type 10:90 optical coupler 109 connected to the linear loop mirror 120 and some of the signals are transmitted to a photo diode 110 functioning as an optical detector and wherein the signals detected by the optical diode 110 are processed by a circuit section 111 and are then feedback to the PZT element 106.

Now, the functions of the components will be explained below.

If the pump laser 101 pumps light in order to oscillate the optical fiber laser, the pumped light is sufficiently amplified in the NALM 103 through the Er fiber 102. At this time, the light within the NALM 103 is kept polarized by the PM-SM Fiber 104.

Meanwhile, when the light within the NALM 103 is sufficiently amplified, it is transmitted to the linear loop mirror 120 through the 50:50 optical coupler 105. At this time, the light modulator 107 implements an active type mode locking. Also, the light within the linear loop mirror 120 proceeds only in one direction by the light isolator 108, which is monitored by the 10:90 optical coupler 109.

At this time, in order to stabilize the optical fiber laser, the light proceeding from the linear loop mirror 120 in an opposite direction to the output port of the 10:90 optical coupler 109 (i.e., light proceeding in an opposite direction to the light isolator) is monitored by the light detector 110.

In case of an ideal loop mirror, if all the locking is realized in the loop mirror, the optical signal is completely transparent and there is little light reflected by the loop mirror. Otherwise, if any changes in the phase of the light occur in the loop mirror, some of light is reflected since it acts as an error signal, which is detected on the side opposite to the output port of the 10:90 optical coupler 109.

If the mode locked optical fiber laser oscillates ideally, the NALM 103 is transparent to the light. However, if any change in the phase is occurred in the loop mirror due to the changes in the length or polarization, the light can be detected in the reflecting direction. Therefore, the present invention can stabilize the length of the optical fiber laser resonator by performing a signal processing in the direction where the amount of the light detected thus can be minimized, feedbacking the light again and then inputting the optical signal by use of the PZT element 106.

The circuit section 111 is a circuit corresponding to a stabilized circuit used for the conventional mode-locked optical loop mirror, which is responsible for electrical control of the PZT element 106 depending on the amount of light in the reverse direction to the reflected signal detected at the photo diode 110.

That is, if the mode-locked optical fiber loop mirror is ideally constructed, all the optical signals would be detected in the transparent port without being detected in the actual reflecting port. However, as the actually constructed loop mirror is incomplete, if any error signal exists in the loop mirror, the optical signal will be detected at the reflecting port. At this time, a signal process, in which the reflecting port detects the optical signal and the circuit section 111 compares the detected signal with the signal from the transparent port, is performed. Then, the PZT within the loop mirror feedbacks the processed signal, which is then processed so that the optical signal detected at the reflecting port can be minimized. Thus, the length of the laser resonator can be stabilized.

As mentioned above, the present invention stabilizes the length of the optical fiber laser resonator by detecting the signal reflected by the optical fiber loop mirror and then feedbacking the detected signal to the laser resonator in the direction where the signal can be minimized. Thus, it has an outstanding effect that it can stabilize the laser very easily and simply compared to the conventional optical fiber stabilization apparatus.

The present invention has been described with reference to a particular embodiment in connection with a particular application. Those having ordinary skill in the art and access to the teachings of the present invention will recognize additional modifications and applications within the scope thereof. It is therefore intended by the appended claims to cover any and all such applications, modifications, and embodiments within the scope of the present invention.

What is claimed is:

1. A light resonator stabilizing apparatus in an optical fiber laser, comprising:

a non-linear optical amplitude loop mirror (NALM) for non-linearly amplifying a laser light provided by a pump laser; and a linear loop mirror coupled to said NALM by an optical coupler and constituting a closed loop for confining the laser light amplified by said NALM, wherein the linear loop mirror comprises a light isolator for proceeding the laser light confined by said linear loop mirror only in one direction;

a light modulator for mode-locking the light within said linear loop mirror;

an optical detector coupled to said linear loop mirror by an optical coupler for detecting the light proceeding in the direction opposite to the light proceeding direction regulated by said light isolator;

a control circuit for generating an electrical control signal depending on the intensity of the light detected by the optical detector;

a piezo-electric transducer (PZT) for receiving and processing the control signal from said control circuit and compensating for the length of said laser resonator so that the intensity of the light proceeding in the opposite direction is minimized.

2. The resonator stabilizing apparatus in an optical fiber laser according to claim 1, wherein the pump laser pumps a gain medium of the light passing through said non-linear optical fiber loop mirror.

3. The resonator stabilizing apparatus in an optical fiber laser according to claim 2 further comprising an optical fiber including erbium (Er) installed between said pump laser and said non-linear optical amplitude loop mirror, for obtaining the gain medium of the light and for waveguiding said laser light pumped by said pump laser to said non-linear optical amplitude loop mirror.

4. The resonator stabilizing apparatus in an optical fiber laser according to claim 1, further comprising a polarized maintenance single mode optical fiber (PM—SM Fiber) for maintaining the polarized light passing through said non-linear optical amplitude loop mirror.

5. The resonator stabilizing apparatus in an optical fiber laser according to claim 1, wherein the optical coupler connecting said NALM and said linear loop mirror is a 10:90 optical coupler.

6. The resonator stabilizing apparatus in an optical fiber laser according to claim 1, wherein the optical coupler installed between said NALM and said liner loop mirror is a 50:50 optical coupler for waveguiding the light from said NALM to said linear loop mirror.

* * * * *